Oct. 26, 1937.  A. D. SMITH  2,097,084
PROCESS AND APPARATUS FOR THE PRODUCTION OF LIGHT HYDROCARBONS
Filed June 19, 1936
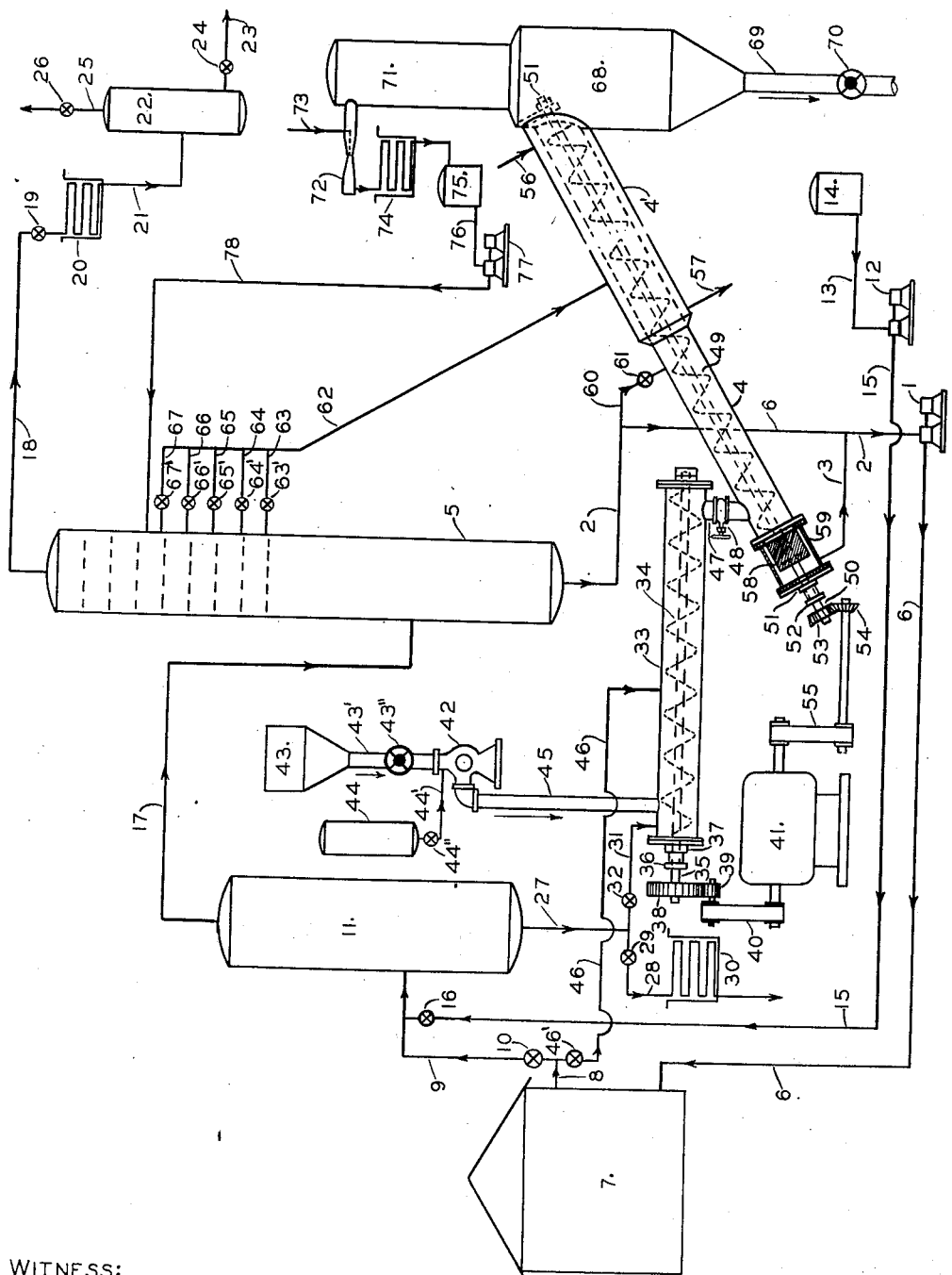
WITNESS:
Charles H. Jenkins
INVENTOR,
Arthur D. Smith Patented Oct. 26, 1937

2,097,084

UNITED STATES PATENT OFFICE 2,097,084

PROCESS AND APPARATUS FOR THE PRODUCTION OF LIGHT HYDROCARBONS

Arthur D. Smith, Park Ridge, Ill., assignor, by mesne assignments, to Jenkins Petroleum Process Company, Chicago, Ill., a corporation of Illinois Application June 19, 1936, Serial No. 86,175

13 Claims. (Cl. 196—55)

This invention relates to improvements in process and apparatus for the production of light hydrocarbons and refers more particularly to a process wherein normally residual and/or partially degraded fractions derived from a cracking body of oil are continuously subjected to cracking conditions independent of those imposed on the cracking body while commingled with finely divided mineral adsorbent towards carbon and/or carbon forming substance with resultant formation of desired light hydrocarbons and a residual cracking stock, hereinafter termed adsorbate, which is continuously returned to the cracking body; an adsorbate being the unadsorbed residual component of a mixture subjected to the action of an adsorbent.

The filtration of a partially degraded cracking body of oil through a quiescent bed of fuller's earth, spent bone char or product of similar nature with a return of the filtrate to the cracking body has been described in U. S. Patent No. 1,239,423, the present invention being an improvement thereon in providing inter alia for cracking heavily degraded or residual hydrocarbons commingled with an adsorbent towards carbon forming substance, such as fuller's earth, under a concentration of complex hydrocarbon polymerides operatively impossible in percolation practice and thus substantially increasing the yield of gasoline.

The present invention is also an improvement over the use of adsorbents as related in U. S. Patent No. 2,031,336 in providing for a more positive commingling of adsorbent with the reacting hydrocarbons through the agency of a mechanically operated incorporating means and also in the method of continuously separating carbon-laden, spent adsorbent from associated adsorbate; as well as in special apparatus for carrying out the process.

Among important objects of the invention are: to provide for continuously subjecting a mechanically agitated and propelled stream of residual hydrocarbons commingled with finely divided mineral adsorbent towards carbon forming substance to a cracking temperature under a pressure preventive of material vaporization of such hydrocarbons; to provide for delivering the products of such treatment comprising light fractions, adsorbate and carbon-laden, spent adsorbent to a non-cracking, low pressure separating zone; to provide for separating in such zone the light fractions as vapor, contacting the resultant adsorbate-saturated, spent adsorbent as a mechanically agitated and upwardly propelled stream with contra-flowing diluent hydrocarbons such as reflux condensate and segregating substantially adsorbate-free, spent adsorbent; to provide for respectively educting the separated vapor, withdrawing through interstices preventive of the passage of adsorbent, adsorbate commingled with diluent hydrocarbons and forcibly ejecting from the low pressure separating zone the segregated spent adsorbent as a dry, carbon-laden residue; to provide for dephlegmating the educted vapor, condensing desired light hydrocarbons and introducing separated reflux condensate to the low pressure separating zone; to provide for separating a primary cracking body of hydrocarbons into vapor, reflux condensate and residual fractions, imposing on such residual fractions the adsorptive cracking treatment and effecting separation of the products thereof as above described, admixing vapor from the primary and residual treatments, dephlegmating such admixed vapor and separating desired light hydrocarbons from reflux condensate, and continuously returning to the primary cracking body adsorbate commingled with reflux condensate for treatment as aforesaid; to provide means for the above described adsorptive cracking of residual hydrocarbons designed to intimately incorporate such hydrocarbons with adsorbent and forcibly expel the products of such treatment under a controlled pressure; to provide non-cracking, low pressure separating means to receive such expelled products designed inter alia to separate light fractions as vapor, to educt such vapor to a dephlegmating zone, to intimately commingle adsorbate-saturated spent adsorbent with diluent hydrocarbons such as reflux condensate, to permit withdrawal of adsorbate commingled with reflux condensate unadmixed with spent adsorbent and to forcibly eject such spent adsorbent as a substantially oil-free, dry, carbon-laden residue; to provide means for dephlegmating the educted vapor, condensing desired light hydrocarbons and introducing separated reflux condensate to the low pressure vaporizing zone; to provide means for separating a cracking body of oil into vapor, reflux condensate and residual fractions, means for respectively imposing adsorptive cracking conditions on such residual fractions and separating the products of such treatment as above described, and means for continuously returning adsorbate commingled with reflux condensate to the cracking body of oil for treatment as aforesaid.

In order that the invention may be better understood, reference is made to the attached diagrammatic drawing representing a form of apparatus suitable for carrying out the invention; and wherein a high pressure pump 1, supplied through the line 2 with a composite stock consisting of commingled adsorbate or residuary cracking stock and reduced reflux condensate discharged from the low pressure separating zone 4 through the line 3, and heavy reflux condensate discharged from the bubble tower 5 through the line 2, delivers such composite stock through the line 6 to the conventional coil type of cracking furnace 7 from which the major portion of the cracking body of oil is released through the lines 8 and 9, as controlled by valve 10, to the vapor separator 11. The pump 12, supplied through the line 13 from the raw stock tank 14, delivers "quench" oil through the line 15 to the line 9, as controlled by valve 16. Either or both of such oils may carry in suspension finely divided mineral adsorbent possessing adsorptive action towards carbon and/or carbon forming substance, such as lime or fuller's earth or mixtures of adsorbents, although this feature is not claimed as a part of the present invention.

Light hydrocarbons separated in the vapor separator 11 pass through the vapor line 17 to the bubble tower 5 where they are dephlegmated in the usual manner, preferred gasoline vapors escaping through the line 18, as controlled by valve 19, to enter the condenser 20 from which liquid gasoline flows via the line 21 to the receiver 22, finished gasoline being withdrawn therefrom through the line 23, as controlled by valve 24; while permanent gas escapes from the system through the line 25 as controlled by valve 26.

Residual fractions separated in the vapor separator 11 are discharged through line 27; the portion of such product desired as conventional fuel oil flowing through line 28, as controlled by valve 29, to enter the cooler 30 from which the fuel oil may be conveyed to any suitable storage (not shown), while that portion of the residual fractions to be subjected to further cracking is delivered through line 31, as controlled by valve 32, to enter the secondary cracking zone 33. The latter, preferably of cylindrical form and heavily insulated to conserve the contained heat of the fractions discharged therein, is provided with a rotating helical flight 34 integral with the shaft 35 and designed to effect intimate contact of the oil with adsorbent, while at the same time mechanically propelling the mixture forward. The shaft 35 rotates in bearings 36 and extends externally through the stuffing box 37, the shaft and its integral helical flight being rotated by means of the gears 38 and 39 actuated by the belt drive 40 from the motor 41 or other suitable source of power. The secondary cracking zone is further connected with a feed means for continuously introducing adsorbent, depicted in the drawing as a screw pump 42, supplied with fresh adsorbent from the hopper 43 via pipe 43' equipped with valve 43'', and with incorporating oil delivered from tank 44 via line 44' equipped with valve 44''; the mixture thus formed entering the secondary cracking zone as a thick paste through pipe 45. As incorporating oil, a small quantity of the residual fractions withdrawn from the condenser 30 may be advantageously employed; or heavy oil extraneously supplied may be utilized. In lieu of the screw pump, alternate mixing tanks discharging through valved lines to a common closed feed tank from which the adsorbent paste is forced into the system by a ram type of pump may be substituted; or other suitable mechanism adapted to introduce adsorbent under the system pressure may be utilized. It will also be noted that provision is made for diverting a portion of the primary body of the cracking oil discharged from the furnace 7 by the line 8, through the line 46 as controlled by valve 46', to the secondary cracking zone past the point of entrance of residual fractions discharged from the vapor separator; the purpose of supplying additional feed at such point to be later explained.

The secondary cracking zone is connected by the pipe 47, fitted with pressure release valve 48, to the inclined, low pressure separating zone 4, which is preferably of cylindrical form, heavily insulated and having internally disposed, as in the case of the secondary cracking zone, a helical flight 49 integral with the shaft 50. The latter rotates in bearings 51 and passes externally through the stuffing box 52; rotation being effected by the gears 53 and 54 and belt drive 55 through the agency of the motor 41 or other source of power. The upper end of the low pressure separating zone 4 is preferably provided with a heating jacket means 4', supplied with superheated steam through line 56 and released through line 57, or by other suitable heating fluid; while the lower end of such zone is formed of a metal screen 58, surrounded by a boot 59 integral with the low pressure separating zone 4, which boot acts as a receiver for oil passing through the screen, the mesh of the latter being so chosen as to freely admit of passage of oil, but to prevent the escape of adsorbent. The branch line 60, as controlled by valve 61, diverts any desired portion of heavy reflux condensate from the line 2 to the low pressure separating zone 4; while the line 62, with connections to the bubble tower at selective levels 63, 64, 65, 66 and 67 as controlled by valves 63', 64', 65', 66' and 67' respectively, affords introduction of selective, light reflux condensate to such zone at a point past the entrance for the heavy reflux condensate. The upper end of the low pressure separating zone discharges into a hopper 68, provided with a spent adsorbent discharge pipe 69, having a control valve 70; the upper portion of the hopper terminating in a tower 71 from which light fractions are educted via the line 72, equipped with jet 73, to the condenser 74. Liquid condensate accumulating in the tank 75 is returned via the line 76 and pump 77 to the bubble tower 5 through line 78. The eductive means described may be replaced by any convenient method of maintaining a slight subatmospheric pressure on the tower 71.

In the actual operation of the process, if it be desired to produce marketable fuel oil, the cracking practiced in furnace 7 is of an order that upon discharge of the cracking body and commingled "quench" oil to the vapor separator, any desired portion of the therein separated residual fractions may be withdrawn from the system as specification fuel oil; the balance of such fractions being delivered to the secondary cracking zone. Where specification fuel oil is not required, the cracking practiced in furnace 7 may be relatively severe to the extent that the residual fractions delivered to the secondary cracking zone carry a relatively high proportion of complex hydrocarbon polymerides; it being of course understood that such cracking is not conducted to the point of objectionable carbon formation.

The residual fractions which may obtain, for example, in the vapor separator under 50 lbs. pressure and at 770° F., i. e., an incipient cracking temperature, are delivered under a pressure preventive of their substantial vaporization (employing a pump means (not shown) if desired) to the secondary cracking zone and therein intimately contacted, at say 755° F., through the agency of the rotating helical flight with finely divided, mineral adsorbent possessing adsorptive action towards carbon, and carbon forming substance such as asphaltenes and/or complex hydrocarbon polymerides. Among utilizable mineral adsorbents of such nature may be mentioned fuller's earth, spent bone char, alumina, kaolinite, bentonite, bauxite, clays of various types, kieselguhr, lime, and various forms of ochres, or mixtures thereof, but I prefer to employ fuller's earth not too finely divided, for example, a grade that will pass through a standard 20 mesh to the inch sieve and be retained by a 60 mesh in the approximate ratio of 1–10 lbs., of fuller's earth per barrel of residual fractions to be treated; the exact quantity varying with the asphaltene and/or hydrocarbon polymeride content of the fractions being processed. The relatively coarse mesh mentioned is desirable to better effect the separation of the spent earth from its adsorbate in a manner to be later described.

On account of the concentration of the more readily decomposable constituents of the residual fractions, i. e., the asphaltenes and/or complex hydrocarbon polymerides, on the surface of the adsorbent, the cracking reaction in the secondary cracking zone proceeds under the relatively low prevailing temperature more rapidly than when such substances exist simply in solution or colloidal suspension. In other words, a higher gasoline yield is obtained for a given time factor under the conditions obtaining in the secondary cracking zone than for instance where post-cracking is conducted without adsorbent in a vapor separator carrying a high liquid oil level. This desideratum is admittedly approached in adsorbent percolation conducted under cracking conditions, and in systems in which the adsorbent is dispersed in a cracking stream of hydrocarbons; but attains its maximum in the present invention where a fresh surface of adsorbent is continuously and positively exposed to the reacting hydrocarbons under concentrations of degraded products where filtration and uniform stream flow would be manifestly respectively impossible. The mechanically driven helical flight not only effects an intimate mixture of adsorbent and reacting hydrocarbons, but continuously propels such mixture forward under concentrations limited only to a point short of mass coking. Where thereis a tendency for the latter to occur, as in the treatment of exceptionally heavy residual fractions at temperatures approximating 800° F., the reacting mixture is diluted with a sufficient quantity of the cracking body, released from the furnace 7 before comminglement with the "quench" oil, to maintain the non-adsorbed hydrocarbons or adsorbate in a state of fluidity; admission of such diluent being effected as previously mentioned through line 46, as controlled by valve 46', at a point beyond the introduction of the residual fractions.

The adsorbate or residuary cracking stock, commingled with the adsorbate-saturated, carbon-laden, spent adsorbent is discharged from the secondary cracking zone through the pipe 47, as controlled by valve 47', to the base of the inclined, low pressure separating zone 4, wherein the pressure is released to substantially atmospheric. The adsorbate-saturated, spent adsorbent, elevated by the rotating helical flight, is continuously contacted in its ascent by contra-flowing, cooler reflux condensate from the bubble tower 5, first meeting heavy condensate withdrawn from the base of the tower through lines 2 and 60, as controlled by valve 61; then with its oil content substantially removed by such contact, next encountering lighter reflux condensate of increased volatility selectively withdrawn from one or more of the upper pans of the bubble tower, such lighter condensate being so chosen in boiling point as to complete the removal of oil from the spent adsorbent. A dephlegmating action takes place in the meantime so that heavy reflux condensate fractions descend to the base of the low pressure separating zone, and commingled with the adsorbate, pass through the screen bottom 58 of the separator to the boot 59, and thence flowing through the line 3, unite with the remainder of the reflux condensate discharging from the bottom of the bubble tower 5 not employed as a wash; the resultant composite stock being continuously returned via line 2, pump 1, and line 6 to the primary cracking body.

The light fractions separated in the low pressure separating zone, whose volatilization is aided by the heating jacket means 4', rise in the tower 71, are educted therefrom, condensed and returned to the bubble tower for further dephlegmation; such returned fractions including not only the light fractions and gasoline produced in the secondary cracking zone, but obviously such as are dephlegmated from the light reflux condensate introduced as a wash.

The now substantially oil-free, carbon-laden, spent adsorbent discharging into the hopper 68, is rejected from the system through pipe 69, as controlled by valve 70; and may be discarded entirely, or revivified and returned to the process depending on economic conditions.

The invention is not limited in its process scope to the exact pressures, temperatures and quantities mentioned herein, which are intended merely as typical examples; nor is the apparatus required to be constructed in the relational size or form depicted in the drawing. It is to be further assumed the apparatus is equipped with requisite thermometric controls, pressure gauges, pressure and speed regulators, and other process control means well-known in the arts.

Other advantages than those mentioned will undoubtedly occur to those skilled in the art, and what I claim as new and desire to protect by Letters Patent is:

1. A process for the production of light hydrocarbons from residual hydrocarbons which comprises subjecting a mechanically agitated stream of residual hydrocarbons commingled with finely divided mineral adsorbent towards carbon forming substance to a cracking temperature under a pressure preventive of material vaporization of said residual hydrocarbons, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons and segregating thereby said spent adsorbent, respectively educting said vapor, withdrawing said adsorbate commingled with said diluent hydrocarbons and ejecting from said zone said spent adsorbent, dephlegmating the educted vapor and condensing as said light hydrocarbons preferred light fractions so obtained.

2. A process for the production of light hydrocarbons from residual hydrocarbons which comprises subjecting a mechanically agitated stream of residual hydrocarbons commingled with finely divided mineral adsorbent towards carbon forming substance such as fuller's earth to a cracking temperature under a pressure preventive of material vaporization of said residual hydrocarbons, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons such as reflux condensate and segregating thereby said spent adsorbent, respectively educting said vapor, withdrawing said adsorbate commingled with said diluent hydrocarbons and ejecting from said zone said spent adsorbent, dephlegmating the educted vapor, separating reflux condensate and condensing as said light hydrocarbons preferred light fractions so obtained.

3. A process for the production of gasoline from residual hydrocarbons which comprises subjecting a mechanically agitated stream of such hydrocarbons commingled with finely divided fuller's earth to a cracking temperature under a pressure preventive of material vaporization of said residual hydrocarbons, discharging the products of such cracking treatment comprising light hydrocarbons, adsorbate and spent earth to a zone of reduced pressure and separating therein said light hydrocarbons as vapor while simultaneously contacting the resultant adsorbate-saturated, spent earth as a mechanically agitated stream with contra-flowing reflux condensate and segregating thereby said spent earth, respectively educting said vapor, withdrawing said adsorbate commingled with said reflux condensate and ejecting from said zone said spent earth, dephlegmating the educted vapor, separating reflux condensate and condensing as said gasoline preferred light fractions so obtained.

4. A continuous process for the production of gasoline and other light hydrocarbons from residual hydrocarbons which comprises the continuous steps of subjecting a mechanically agitated stream of residual hydrocarbons commingled with finely divided mineral adsorbent towards carbon forming substance such as fuller's earth to a cracking temperature under a pressure preventive of material vaporization of said residual hydrocarbons, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing reflux condensate and segregating thereby said spent adsorbent, respectively educting said vapor, withdrawing said adsorbate commingled with said reflux condensate, and ejecting from said zone said spent adsorbent, dephlegmating the educted vapor, separating reflux condensate and condensing as said gasoline and said light hydrocarbons preferred light fractions so obtained.

5. A process for the production of light hydrocarbons from residual hydrocarbons which comprises subjecting a mechanically agitated stream of residual hydrocarbons commingled with finely divided mineral adsorbent towards carbon forming substance to a cracking temperature under a pressure preventive of material vaporization of said residual hydrocarbons, adsorptively concentrating the more readily decomposable components of said residual hydrocarbons on the surface of said adsorbent and increasing thereby the cracking rate for a given cracking temperature, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons and segregating thereby said spent adsorbent, respectively educting said vapor, withdrawing said adsorbate commingled with said diluent hydrocarbons and ejecting from said zone said spent adsorbent, dephlegmating the educted vapor and condensing as said light hydrocarbons preferred light fractions so obtained.

6. A process for the production of light hydrocarbons from residual hydrocarbons which comprises subjecting a mechanically agitated stream of residual hydrocarbons, containing asphaltenes and complex hydrocarbon polymerides and commingled with finely divided mineral adsorbent towards carbon forming substance such as fuller's earth, to a cracking temperature under a pressure preventive of material vaporization of said residual hydrocarbons, adsorptively concentrating said asphaltenes and said complex hydrocarbon polymerides on the surface of said adsorbent and increasing thereby the yield of light fractions for a given cracking rate, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons such as reflux condensate and segregating thereby said spent adsorbent, respectively educting said vapor, withdrawing said adsorbate commingled with said diluent hydrocarbons and ejecting from said zone said spent adsorbent, dephlegmating the educted vapor, separating reflux condensate and condensing as said light hydrocarbons preferred light fractions so obtained.

7. A process for the production of gasoline and other light hydrocarbons from residual hydrocarbons which comprises subjecting a mechanically agitated and propelled stream of residual hydrocarbons commingled with finely divided mineral adsorbent towards carbon forming substance such as fuller's earth to a cracking temperature under a pressure preventive of material vaporization of said residual fractions, introducing to such cracking stream hydrocarbons less degraded than said residual hydrocarbons, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated and propelled stream with contra-flowing streams of reflux condensate of selective volatilities and segregating thereby substantially adsorbate-free, spent adsorbent, respectively educting said vapor, withdrawing through interstices preventive of the passage of said adsorbent, said adsorbate commingled with said reflux condensate and ejecting from said zone said spent adsorbent as a dry, carbon-laden residue, dephlegmating the educted vapor, separating reflux condensate of selective volatilities and condensing as said gasoline and said light hydrocarbons preferred light fractions so obtained.

8. A cyclic process for the production of light hydrocarbons which comprises subjecting a cracking body of heavier hydrocarbons to reduced pressure and separating thereby vapor from residual fractions, releasing the vapor to a dephlegmating zone and subjecting the residual fractions as a mechanically agitated stream commingled with finely divided adsorbent towards carbon forming substance to cracking conditions of heat and pressure independent of those imposed on said cracking body, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons and segregating thereby said spent adsorbent, respectively educting said vapor, withdrawing said adsorbate commingled with said diluent hydrocarbons and ejecting from said zone said spent adsorbent, admixing the educted vapor with the initially released vapor, dephlegmating and separating preferred light fractions from reflux condensate, condensing such preferred light fractions as said light hydrocarbons, employing said reflux condensate as said diluent hydrocarbons and returning to said cracking body of heavier hydrocarbons said adsorbate commingled with reflux condensate for treatment as aforesaid.

9. A cyclic process for the production of light hydrocarbons which comprises subjecting a cracking stream of heavier hydrocarbons to reduced pressure and separating thereby vapor from residual fractions, releasing the vapor to a dephlegmating zone and subjecting the residual fractions as a mechanically agitated stream commingled with finely divided adsorbent towards carbon forming substance such as fuller's earth to a cracking temperature under a pressure preventive of material vaporization of said residual fractions, discharging the products of such cracking treatment comprising light fractions, adsorbate and spent adsorbent to a zone of reduced pressure and separating therein said light fractions as vapor while simultaneously contacting the resultant adsorbate-saturated, spent adsorbent as a mechanically agitated stream with contra-flowing, diluent hydrocarbons such as reflux condensate and segregating thereby said spent adsorbent, respectively educting said vapor, withdrawing said adsorbate commingled with said diluent hydrocarbons and ejecting from said zone said spent adsorbent, admixing the educted vapor with the initially released vapor, dephlegmating and separating preferred light fractions from reflux condensate, condensing such preferred light fractions as said light hydrocarbons, employing said reflux condensate as said diluent hydrocarbons and returning to said cracking stream of heavier hydrocarbons said adsorbate commingled with reflux condensate for treatment as aforesaid.

10. A cyclic process for the production of gasoline and other light hydrocarbons which comprises subjecting a cracking stream of heavier hydrocarbons to reduced pressure and separating thereby vapor from residual fractions, releasing the vapor to a dephlegmating zone and subjecting the residual fractions as a mechanically agitated stream commingled with finely divided fuller's earth to a cracking temperature under a pressure preventive of material vaporization of said residual fractions, introducing to such cracking mixture sufficient of said cracking stream of heavier hydrocarbons to inhibit coking of said residual fractions, discharging the products of such cracking treatment comprising light fractions, adsorbate and carbon-laden, spent earth to a zone of reduced pressure and separating therein said light fractions as vapor while simultaneously contacting the resultant adsorbate-saturated, spent earth as a mechanically agitated and upwardly propelled stream with contra-flowing, progressively introduced streams of reflux condensate of selective volatilities and segregating thereby substantially adsorbate-free, spent earth, respectively educting from the upper part of said zone said vapor, withdrawing from the lower part through interstices preventive of the passage of said earth said adsorbate commingled with said reflux condensate and ejecting from the middle part of said zone said spent fuller's earth as a dry, carbon-laden residue, admixing the educted vapor with the initially released vapor, dephlegmating such mixture to separate preferred light fractions from reflux condensate of selective volatilities and condensing the preferred light fractions as said gasoline and other desired light hydrocarbons, introducing portions of said reflux condensate to said low pressure separating zone in the aforesaid manner, and returning the remainder admixed with the withdrawn commingled adsorbate and reflux condensate to the cracking stream of heavier hydrocarbons for treatment as aforesaid.

11. Apparatus for the production of light hydrocarbons comprising separate charging means for hydrocarbons and adsorbent discharging through valved lines to a cracking still, said still being fitted with a positive, helical incorporating and propelling means and discharging through a valved line to an inclined, low pressure separating drum, said drum being connected to a valved line for supplying diluent hydrocarbons and terminating at its lower end in a boot integral therewith and divided from said drum by a metallic screen, the upper end of said drum extending to a hopper with valved outlet and superimposed vaporizer, said drum being further provided with a positive, helical incorporating and elevating means, a valved discharge line from said boot and an eductive means from said vaporizer discharging to a dephlegmator, said dephlegmator being equipped with a vapor line leading to a condenser for recovering said light hydrocarbons and a reflux condensate line for supplying said diluent hydrocarbons.

12. Apparatus for the production of light hydrocarbons comprising separate charging means for hydrocarbons and adsorbent discharging through valved lines to the front part of a cracking still additional valved means for delivering hydrocarbons near the rear end of said still, said still being fitted with a positive, helical incorporating and propelling means and discharging through a valved line to an inclined, low pressure separating drum, said drum being connected at a plurality of points to valved lines supplying diluent hydrocarbons of selective volatilities and termininating at its lower end in a boot integral therewith and divided from said drum by a metallic screen, the upper end of said drum extending to a hopper with valved outlet and superimposed vaporizer, said drum being further provided with a positive, helical incorporating and elevating means, a valved discharge line from said boot and an eductive means from said vaporizer discharging to a dephlegmator, said dephlegmator being equipped with a vapor line leading to a condenser for recovering said light hydrocarbons and reflux condensate lines for supplying said diluent hydrocarbons of selective volatilities.

13. Apparatus for the production of gasoline and other light hydrocarbons from heavier hydrocarbons comprising a primary cracking means for said heavier hydrocarbons respectively discharging through valved lines to a vapor separator and a secondary cracking still, said vapor separator being fitted with a valved vapor line leading to a dephlegmator and a valved residuum draw-off line respectively discharging to a cooling means and to said secondary cracking still, said dephlegmator being equipped with a vapor line leading to a condenser for recovering said gasoline and said other light hydrocarbons and a series of selective valved reflux condensate discharge lines including a bottom draw-off line leading to the suction side of a high pressure pump feeding said primary cracking means, said still being supplied with adsorbent through a valved adsorbent charging means, fitted with a positive, helical incorporating and propelling means and discharging through a valved line to an inclined, low pressure separating drum, said drum being connected at a plurality of points to said reflux condensate discharge lines and terminating at its lower end in a boot integral therewith and divided from said drum by a metallic screen, the upper end of said drum extending to a hopper with valved outlet and super-imposed vaporizer, said drum being further provided with a positive, helical incorporating and elevating means, a valved discharge line from said boot connecting to said bottom draw-off line and an eductive means from said vaporizer discharging to said dephlegmator.

ARTHUR D. SMITH.